J. W. McMILLAN.
COTTON CHOPPER AND CULTIVATOR.
APPLICATION FILED JAN. 14, 1911.
1,025,761.
Patented May 7, 1912.
3 SHEETS—SHEET 1.
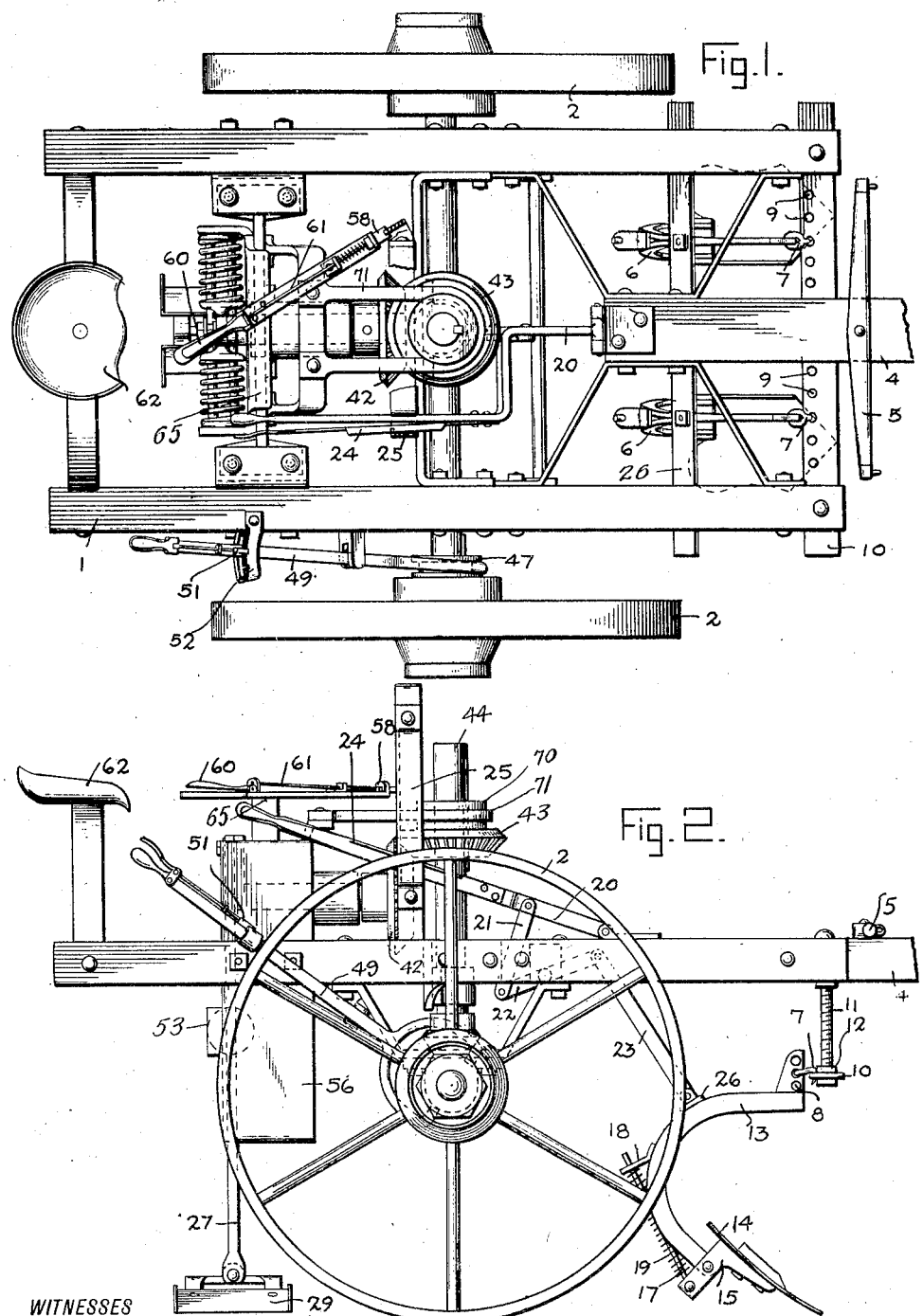

J. W. McMILLAN.
COTTON CHOPPER AND CULTIVATOR.
APPLICATION FILED JAN. 14, 1911.
1,025,761.
Patented May 7, 1912.
3 SHEETS—SHEET 2.
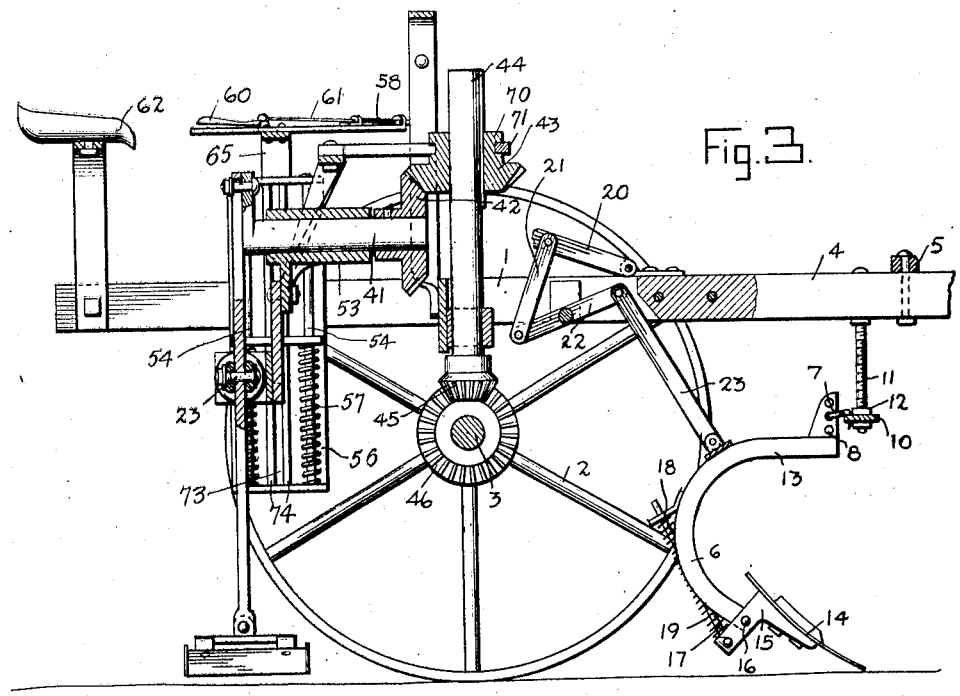
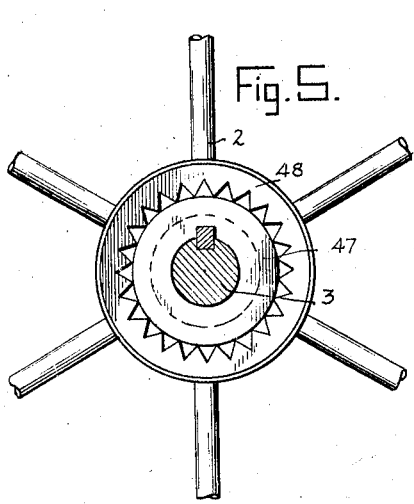
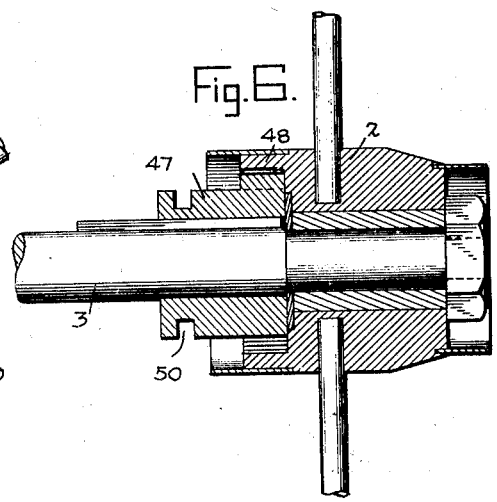
WITNESSES
INVENTOR
John W. McMillan
BY
ATTORNEYS

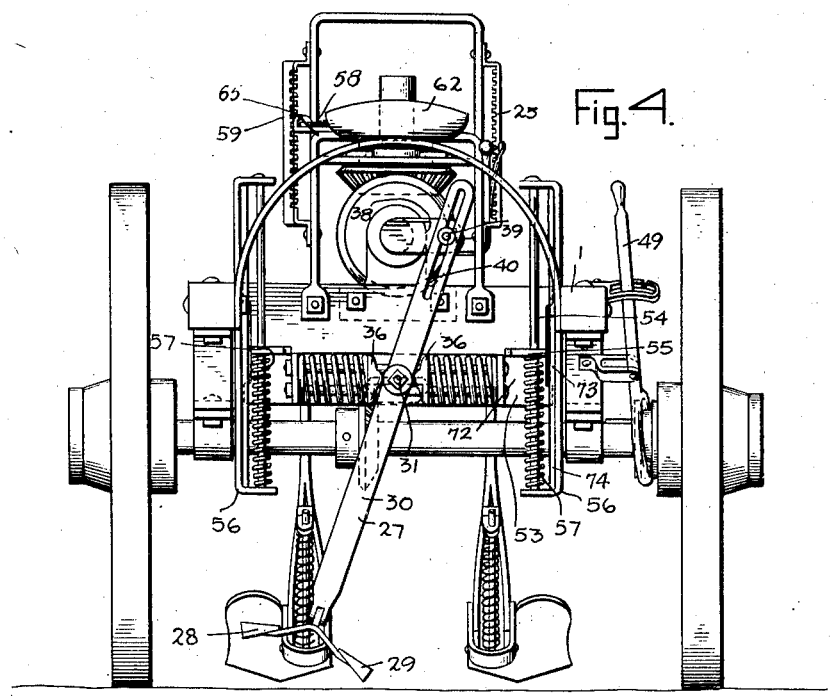
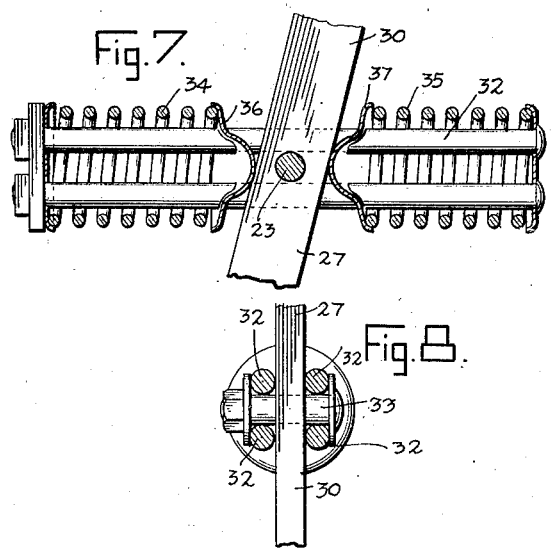
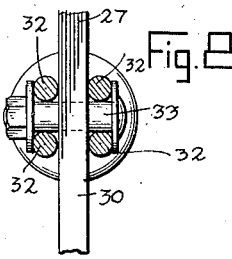

UNITED STATES PATENT OFFICE.

JOHN WILLIAM McMILLAN, OF EL DORADO, ARKANSAS.

COTTON CHOPPER AND CULTIVATOR.

1,025,761.  Specification of Letters Patent.  Patented May 7, 1912.

Application filed January 14, 1911. Serial No. 602,560.

*To all whom it may concern:*

Be it known that I, JOHN W. MCMILLAN, a citizen of the United States, and a resident of El Dorado, in the county of Union and State of Arkansas, have invented a new and Improved Cotton Chopper and Cultivator, of which the following is a full, clear, and exact description.

This invention relates to a new and improved device which is adapted to simultaneously chop cotton plants or the like and cultivate the same.

An object of this invention is to provide an implement which will simultaneously thin cotton plants and cultivate the same, which will be simple in construction, comparatively inexpensive to manufacture, strong, durable, readily adjusted and easily operated.

Another object of this invention is to provide an implement with one or more hoes, adjustable as to their angle and depth of penetration, and having means for yielding in case of coming in contact with obstacles.

A further object of this invention is to provide an implement with a stalk-chopping portion, having a resiliently mounted fulcrum or pivot point adapted to yield in case the cutting edges come in contact with an obstruction, such as a rock.

A still further object of this invention is to provide a stalk-cutting mechanism having driving means therefor, adapted to be adjusted as to height without disturbing the driving connections.

These and further objects, together with the construction and combination of parts, will be more fully described hereinafter and particularly set forth in the claims.

Reference is to be had to the accompanying drawings forming a part of this specification, in which similar characters of reference indicate corresponding parts in all the views, and in which—

Figure 1 is a top plan view; Fig. 2 is a side view in elevation; Fig. 3 is a vertical longitudinal section; Fig. 4 is a rear end view in elevation; Fig. 5 is a fragmentary section taken at right-angles to the section illustrated in Fig. 6, showing the form of clutch used in connecting the axle in driving relation with one of the supporting wheels; Fig. 6 is a vertical section taken at right-angles to the section illustrated in Fig. 5, showing the means for connecting the axle in driving relation with one of the supporting wheels; Fig. 7 is a detail vertical section showing the yielding support for the fulcrum of the chopping mechanism; and Fig. 8 is a section taken at right-angles to the section illustrated in Fig. 7, showing another view of the yielding pivotal support or fulcrum for the chopping mechanism.

Referring more particularly to the separate parts of this invention, as embodied in the form shown in the drawings, 1 indicates a frame, which is supported in any suitable manner, as by means of wheels 2, connected by an axle 3. The frame and wheels, which comprise the carriage, may be drawn over the ground by any suitable means, such as draft animals attached to a pole 4 and a tree 5 connected in any suitable manner to the frame 1.

For the purpose of cultivating the rows of growing plants, such as cotton plants, there are provided one or more, preferably a plurality of plows 6, of any suitable form, which are adjustably supported in a pivotal manner at their forward ends in any suitable manner, as by means of a hook 7, which is adapted to engage in any one of a plurality of openings 8 in the plow, and also is adapted to engage in any one of a number of openings 9 in a transverse beam 10. It will be seen that this affords not only a means of vertical adjustment by means of the openings 8, but also a means of transverse adjustment due to the openings 9, so that the plows can be regulated to different widths between the adjacent rows of plants. The beam 10 can be adjusted vertically itself by reason of the fact that it is supported on screw-threaded hangers 11, and adjustably secured thereto by means of nuts 12. This affords another means of regulating the action of the plows 6. Each of the plows 6 may be of any suitable structure, but preferably consists of a curved plow beam or frame 13 and a share 14 pivotally connected to the frame 13 in any suitable manner, as by means of a bracket 15 and a pivot pin 16. The share 14 may be held in any pre-determined position in a yielding manner by any suitable means, so that when it comes in contact with a stone or other obstruction, it can yield without being damaged to any extent. In this case I have shown a rod 17 connected at one end to the bracket 15 and slidingly engaging in the opening in a lug 18 on the frame 13. Interposed between the lug 18 and the bracket 15, there is provided a spring 19, which holds the blade 14 in a yieldingly-inclined position. Aside from the various adjustments described, the blades of the hoes can be swung bodily out of contact with the ground by means of a lever 20, which may be connected to the frames 13 of the hoes in any suitable manner, as by means of a link 21, a lever 22, a link 23, and a transverse bar 26, which is detachably connected to all the hoes and connects them in unison. The hoes can be locked in any adjusted position by locking the position of the lever 20 in any suitable manner, as for example by the latch 24, which engages a vertically-extending rack bar 25 located on any suitable part of the frame.

For the purpose of chopping the stalks at intervals as the machine moves over the ground, there is provided a chopper 27, which is preferably double-acting, and for this purpose is provided with oppositely-facing cutting blades 28 and 29, which are secured in any suitable manner to a lever 30, which forms the body of the chopper. The lever 30 is preferably provided with a floating pivot or fulcrum 31, so that if either of the blades should come in contact with an obstruction, the device as a whole would yield, rendering accidental breakage of the parts absolutely impossible. The 'floating pivot 31 may be of any suitable character, such as that illustrated in Figs. 7 and 8. In this form, there is shown a plurality of rods 32, preferably four in number, which are supported in any suitable manner on a floating frame 53. These rods are disposed so as to form the corners of a rectangular body, and spaced apart for a sufficient distance so that the lever 30 can swing between the two pairs of superposed rods, and also spaced apart vertically a sufficient distance so that a pivot pin or bolt 33, on which the lever 30 is rotatably mounted, can slide transversely between the horizontally-alined pairs of rods 32. The pivot bolt 33, and thus the fulcrum on the lever 30, is normally held in a mid position by means of a plurality of springs 34 and 35, which act in opposite directions on the fulcrum point 31 of the lever through the intermission of convex caps 36 and 37, which bear on the sides of the lever. These caps may be provided with suitable openings, so that they can slide on the rods 32, and by reason of their convex surfaces, permit the lever to readily rock thereon without any appreciable friction. The chopper 27 may be operated in any suitable manner, as by means of a crank 38 having a pin 39 engaging a slot 40 in the lever 30. This crank may be operated in any suitable manner, as by being secured to a crank shaft 41, which is driven by a bevel gear 42 and rotatably mounted on a floating frame 53. The bevel gear 42 meshes with a bevel gear 43 slidingly mounted in driving relation on a shaft 44 in any suitable manner, as by means of a spline connection, for a purpose to be described and connected to move with the floating frame 53 in a manner to be described.

The shaft 44 is provided with a bevel gear 45, which meshes with a bevel gear 46 on the axle 3. The axle 3 may be connected in driving relation with one or both of the wheels in any suitable manner, as by that illustrated in Figs. 4, 5 and 6, where it will be seen that there is provided a crown clutch 47 splined onto the axle 3 and adapted to engage a corresponding clutch 48 secured to the hub of the wheel 2. The clutch 47 may be manipulated in any suitable manner, as by means of a lever 49, which engages in a groove 50 on the clutch 47, and which is adapted to be locked in any suitable manner in either position of its adjustment, as by means of a latch 51, which engages a sector-rack 52 secured in any suitable manner to the frame 1.

In order that the chopper 27 can be adjusted so as to cut the stalks at varying distances from the ground, or so that it can be raised to a sufficient height so that it will not cut the stalks at all, the frame 53 is a floating frame, and may be movably mounted on the frame 1 in any suitable manner, so as to slide vertically.

In the form shown in the drawings, I have provided a plurality of vertically-extending rods 54 arranged in pairs on each side, which extend through openings in plate brackets 55 on the frame 53, and are secured to the frame 1 in any suitable manner, as by means of brackets 56. The movement of the floating frame 53 can be further steadied by having a transversely-extending member 72 on the frame 53 project at the sides into guideways 73 formed in inwardly-facing sides of the brackets 56 by vertically-extending parallel ribs 74.

For the purpose of supporting the floating frame 53 and normally tending to maintain it in its uppermost position, there are provided a plurality of springs 57 disposed beneath the plate brackets 55 and supported by the brackets 56. The frame 53 may be locked in any position of adjustment, as by means of a latch 58, which engages a rack bar 59 fixedly connected in any suitable manner to the frame 1. This latch 58 can be operated in any suitable manner, as by means of a handle 60, which is connected thereto by means of a link 61, and is located in juxtaposition to an operator's seat 62, which is also conveniently located with respect to the other levers 20 and 49. The handle 60 and the latch 58 may be connected to the frame 53 in any suitable manner, as by being supported in an extension 65 on said frame. In order that the gear 43 will always keep in mesh with the gear 42 during the up and down movement of the frame 53, it is held so as to move with the frame, in any suitable manner, as by being provided with a grooved collar 70, in the groove of which extends a U-shaped bracket 71, fixed in any suitable manner to the frame 53. By this arrangement, the gear is permitted to rotate, and yet forced to travel with the frame, which action is permitted by its spline connection with the shaft 44.

The operation of the device will be readily understood when taken in connection with the above description. The device may be driven along the ground in any suitable manner, as by means of draft animals, and the chopping and cultivating action may be carried on either simultaneously or one independent of the other. In event the device is only used to cultivate, the floating frame 53 is permitted to rise to its highest position by releasing the latch 58, and the driving mechanism can be disconnected by manipulating the clutch 47 through the lever 49. In event it is desired to raise the cultivating hoes 6 out of the ground, they can be manipulated simultaneously by means of the lever 20. Any slight adjustment of the pitch of the hoe blades 29 can be regulated by the hooks 7 and the screw hangers 11. The transverse adjustment of the hoes can be also regulated by means of the hooks 7 and the openings 9, so as to accommodate rows of plants at varying distances from each other. When using the chopper 27, the clutch 47 is connected to the clutch 48 so that there is a direct drive between one of the wheels 2 and the crank shaft 41. The chopper 27 is then swung from side to side, alternately cutting stalks in rows disposed on opposite sides of the chopper.

If by any chance one of the chopper blades should strike an obstruction, the yielding fulcrum or pivot of the chopper would absorb the shock without breaking the blade or stopping the driving mechanism. In view of the fact that the gear 43 is splined on the shaft 44, the driving connections may always be maintained between the chopper 27 and the axle 3 in any adjusted position of the chopper.

While I have shown one embodiment of my invention, I do not wish to be limited to the specific details thereof, but desire to be protected in various changes, alterations and modifications which may come within the scope of the appended claims.

Having thus described my invention, I claim as new and desire to secure by Letters Patent:—

1. The combination with a carriage, of a floating frame slidingly mounted on said carriage, springs adapted to urge said frame in one direction, and a chopper pivotally mounted on said floating frame, said chopper having a floating fulcrum adapted to yield when said chopper comes in contact with an obstacle.

2. The combination with a frame, of a chopper connected to said frame, said chopper comprising a lever and one or more knives secured to said lever, and a floating fulcrum for said chopper, comprising a plurality of horizontally-extending rods spaced apart horizontally so as to form a passage for said lever, and spaced apart vertically so as to form a passage, a pivot bolt for said lever extending in said last-mentioned passage, and supported by the lowermost of said rods, and springs disposed on opposite sides of said lever and adapted to resist the movement of said lever and said pivot bolt.

3. The combination with a frame, of a chopper connected to said frame, said chopper comprising a lever and one or more knives secured to said lever, and a floating fulcrum for said chopper, comprising a plurality of horizontally-extending rods spaced apart horizontally so as to form a passage for said lever, and spaced apart vertically so as to form a passage, a pivot bolt for said lever extending in said last-mentioned passage, springs disposed on opposite sides of said lever and adapted to resist the movement of said lever and said pivot bolt, each of said springs surrounding all of said rods, and fixed caps slidingly mounted on said rods and interposed between said springs and said lever.

4. The combination with a carriage including a frame, an axle, and wheels mounted on said axle, of a chopper pivotally mounted on said frame and having a plurality of blades so as to be adapted to cut in either direction, said chopper having a slot therein, a crank engaging said slot, a shaft for driving said crank, a bevel gear on said shaft, a bevel gear meshing with said first-mentioned bevel gear, a vertical shaft connected in driving relation with said last-mentioned gear by means of a sliding connection, so that said last-mentioned gear can be vertically adjusted relative to said shaft, and still maintain its driving relation, a bevel gear on said vertical shaft, a bevel gear meshing with said last-mentioned gear and mounted on said axle, and a clutch for connecting said axle with one of said wheels, said chopper being vertically adjustable so as to cut stalks at varying heights from the ground.

5. The combination with a carriage, of a vertically disposed driven shaft therein, a shaft at an angle to said driven shaft, gear connections between said shafts including a spline upon said vertical shaft, a frame slidingly mounted in the carriage and supporting said second shaft, and a chopper pivotally mounted on said frame and having connection with its said shaft, said chopper having a floating fulcrum adapted to yield when the chopper comes in contact with an obstacle.

6. The combination with a carriage, of a vertically disposed driven shaft therein, a shaft at an angle to said driven shaft, gear connections between said shafts including a spline upon said vertical shaft, a frame slidingly mounted in the carriage and supporting said second shaft, springs urging said frame in one direction, means to control the extent of movement of said frame, and a chopper pivotally mounted on said frame and having connection with its said shaft, said chopper having a floating fulcrum adapted to yield when the chopper comes into contact with an obstacle.

In testimony whereof I have signed my name to this specification in the presence of two subscribing witnesses.

JOHN WILLIAM McMILLAN.

Witnesses:
J. A. McWilliams,
J. W. Harman.

Copies of this patent may be obtained for five cents each, by addressing the "Commissioner of Patents, Washington, D. C."